March 29, 1960 W. H. GLASS ET AL 2,930,445
FILTER UNIT
Filed Jan. 29, 1958

INVENTOR.
WILLIAM H. GLASS
BY JEROME R. PIER
Adelbert A. Steinmiller
ATTORNEY

United States Patent Office 2,930,445
Patented Mar. 29, 1960

2,930,445

FILTER UNIT

William H. Glass, Pittsburgh, and Jerome R. Pier, Circleville, Irwin, Pa., assignors to Westinghouse Air Brake Company, Wilmerding, Pa., a corporation of Pennsylvania Application January 29, 1958, Serial No. 711,864

4 Claims. (Cl. 183—4.3)

This invention relates to a filter unit for removing extraneous matter from a gaseous fluid and more particularly to a filter unit for removing oil vapor and water vapor as well as solid partices from a gas, such as air under pressure, flowing through a conduit.

It is well known that in air compressors, lubricating oil leaks past the piston rings and into the compressed air. Also it is well known that the air to be compressed contains some moisture. After compression and cooling of the air, part of the oil and moisture therein is in the form of condensate and the remainder is in the form of vapor. Many devices are known for removing condensate from compressed air flowing through a conduit. However, these devices do not remove the water vapor and oil vapor. When the air containing the oil vapor and water vapor is supplied to a control device, especially devices for controlling air actuated mechanisms, the combination of oil vapor and water vapor collects as emulsified oil resulting in the formation of resins or gums that cause parts of the mechanisms to stick and otherwise impair the effective operation of the control device.

One form of filter unit that has been used to remove water vapor and oil vapor from air under pressure supplied from an air compressor consists of one or more filter cartridges containing a metallic oxide desiccant, such as granular aluminum oxide. These cartridges are so arranged that the compressed air must flow through the cartridges before it is supplied to the devices operated thereby or otherwise utilizing the compressed air. The compressed air, as it thus flows through the desiccant, will have the water vapor and oil vapor adsorbed therefrom by the desiccant.

It has been found that filter cartridges containing a granular desiccant do not satisfactorily provide clean dry air in all situations, for when subject to vibration and shock the rubbing together of the granular particles of the desiccant results in the forming of a finely divided dust or powder that becomes entrained in the compressed air flowing through the desiccant. Subsequently, when this compressed air is used in air-operated devices, the dust or powder contained therein is deposited or settles on the walls of the chambers and passages of these devices. Such deposits are very undesirable since they may clog or completely close air-flow passages thus interfering with and even preventing operation of the device. Moreover, the finely divided dust from the desiccant has an abrasive effect and this is conducive to excessive wear of parts of devices utilizing the compressed air.

To retain the advantages of a filter unit of the metallic oxide desiccant type for removing water vapor and oil vapor from a gas, such as air under pressure, and at the same time prevent finely divided dust from the desiccant passing on, the invention, in its preferred embodiment, provides a filter unit comprising a suitable housing containing one or more metallic oxide desiccant cartridges, and in addition thereto a cylindrical permeable member of such porosity as to prevent the passage of fine particles of desiccant dust into the air stream which would cause detrimental effect to the control devices to which the air under pressure is supplied. The permeable member is arranged within the housing on the downstream side of the cartridges so that the air under pressure passes through the permeable member after passing through the cartridges, thereby removing finely divided desiccant dust that may leave the desiccant cartridges.

It is the general object of this invention, therefore, to provide a filtering device having a suitable desiccant for removing oil vapor and water vapor from compressed air flowing therethrough and having, in addition, a permeable member located downstream of the desiccant for preventing the passage of solid particles of desiccant dust or dirt into the air stream delivered from the device.

The invention, both as to the organization and method of operation, will best be understood from the following description of a specific embodiment when read in conjunction with the accompanying drawings in which.

Figures 1, 2, 3:
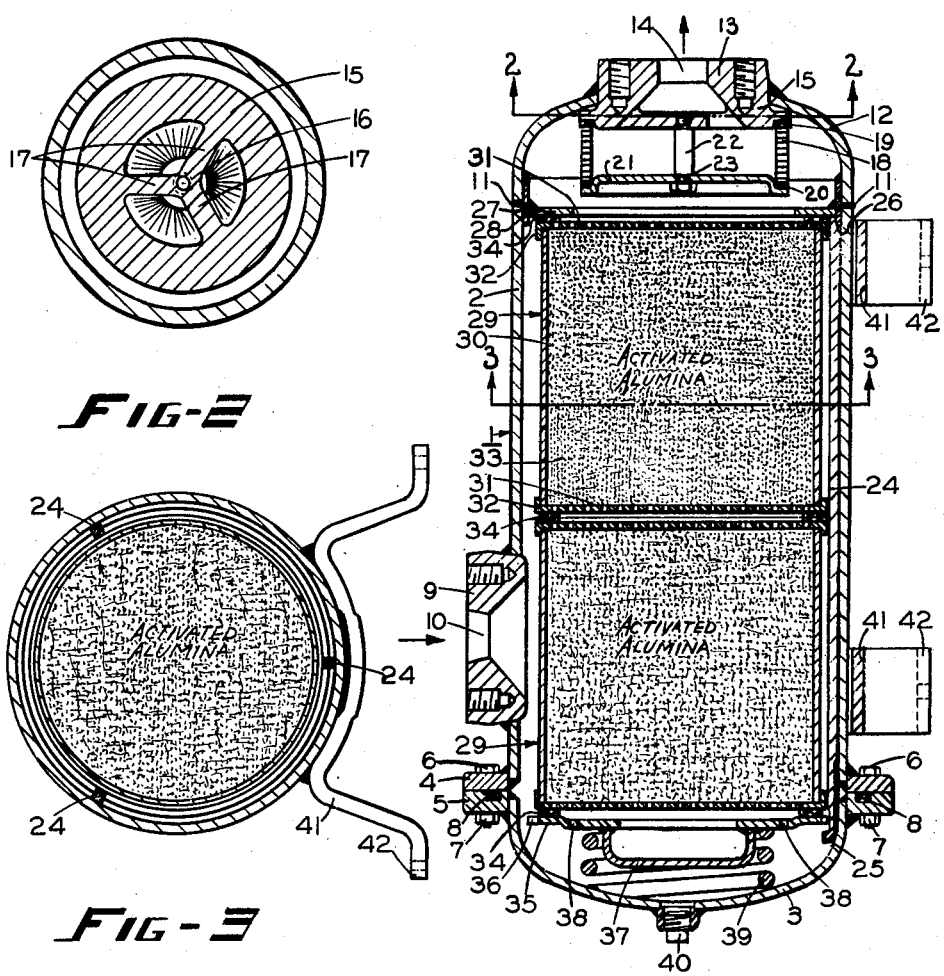
Fig. 1 is a vertical cross-sectional view of the filtering apparatus.
Fig. 2 is a transverse cross-sectional view, taken along the line 2—2 of Fig. 1.
Fig. 3 is a transverse cross-sectional view, taken along the line 3—3 of Fig. 1.

In the construction illustrated in the drawing, the filtering apparatus includes a housing generally designated 1, disposed upright as shown, comprising a hollow cylindrical-shaped body 2 and a removable bell-shaped cover 3. An annular flange 4 is welded to the exterior of body 2 at its lower end, as shown in Fig. 1, and a similar flange 5 is welded to the cover 3 at its open end. These flanges are provided with a plurality of mating holes for receiving a plurality of bolts 6 having screw-threaded engagement with nuts 7. The flange 5 that mates with the flange 4 has an annular recess in its surface into which an O-ring 8 is inserted to afford a seal between flanges 4 and 5 when nuts 7 are screw-threaded onto bolts 6.

An air inlet boss 9 fits into an opening in the side of body 2 near its lower end and is circumferentially welded to the body. The boss 9 has an opening 10 therethrough for admission of air into the body housing.

The upper open end of the cylindrical-shaped body 2 has welded thereto by a circular welding bead 11 a second bell-shaped cover 12. An air outlet boss 13, fitted through a central opening in the cover 12, is secured to the cover 12, as by welding, and is provided with an opening 14 therethrough for the exit of air from the filter unit. The boss 13 is provided at its lower end and on the inside of cover 12 with an annular flange 15 having a central portion 16 connected by three equally spaced ribs 17 to the outer portion of the flange. The spaces between the ribs 17 provide a communication between the opening 14 and the interior of a hollow cylindrical permeable member 18 which is disposed between a pair of annular cork gaskets 19 and 20. The gasket 19 is arranged between the flange 15 and one end of the permeable member 18, and the gasket 20 is arranged between the opposite end of member 18 and an annular flanged cup-shaped member 21. The member 21, the gaskets 19 and 20, and the permeable member 18 are held in the assembled relationship, as shown in Fig. 1, by a shouldered stud 22 extending through a central bore 23 in the cup-shaped member 21 with an elastic stop nut screwed on the end thereof to secure the plate 21. The stud 22 has its other end in screw-threaded engagement with a tapped hole in the central portion 16 of the annular flange 15.

For purposes of illustration, the member 18 may be a commercially procurable product, such as ribbon cellulose material impregnated with a phenolic resin and tightly wound in a helix on a mandrel (not shown) to form a hollow cylinder. The walls of the cylindrical member 18 are of such porous nature that air flows through the crevices formed between successive layers or turns of ribbon, the dust or dirt particles being filtered from the air passing through the cylinder wall and deposited on the outside surface of the cylinder. It is to be understood that the invention encompasses any type of construction or material for the permeable member 18 that will prevent the passage radially through the wall thereof of solid matter in excess of 20 microns (one micron equals one millionth of a meter) in dimension contained in the air.

Disposed within the body 2 and equi-spaced around the interior wall thereof are three longitudinal cartridge centering rails 24. The lower end of each rail 24 is provided with an inwardly turned projection 25 for a purpose to be hereinafter described. The upper end of each rail 24 is provided with a recessed shoulder 26 which fits against the lower end of a split ring back-up strip 27. A flat annular cartridge support plate 28 is disposed within the back-up strip 27 and welded thereto.

In assembling the filtering apparatus, after the support plate 28 is welded to the back-up strip 27, the upper end of the circular back-up strip is placed in the open end of the bell-shaped cover 12 and welded thereto. The lower end of the back-up strip 27 is then placed in the upper open end of body 2 and in abutting relationship with the shoulders 26 on the rails 24. The cover 12, body 2, and back-up strip 27 are then all secured together by the hereinbefore-mentioned welding bead 11.

Within the filtering apparatus, as illustrated in the drawing, are two identical filter cartridges 29. It is to be understood that one or any number of cartridges may be used within the housing. The number of cartridges will generally be dictated by the quantity of air flowing through the filter unit. Since the cartridges are identical, the structure of only one will be described.

Each cartridge consists of a hollow circular casing 30 having perforated identical annular end walls 31. The outer peripheral edges of the end walls 31 are bent inwardly at a 90 degree angle to form annular flanges 32 which are fitted over the ends of the casing 30 and spot-welded or soldered thereto. The casing 30 and end walls 31 form a cylindrical cavity 33 therebetween. This cavity 33, in the preferred embodiment of the invention, is filled completely with granular activated alumina desiccant. The invention is not to be limited to the use of activated alumina desiccant but any activated metallic oxide desiccant selected from the group consisting of aluminum, iron and magnesium can be used. Granular desiccant is employed, as contrasted to a molded block, to facilitate the flow of air through the unit.

An annular gasket or seal 34 is secured to each end wall 31 of each filter cartridge 29 by any suitable oil and moisture resistant cement.

The two filter cartridges 29 are arranged one above the other within the body 2 with the gasket 34 secured to the upper end wall 31 of the upper cartridge 29 in sealing engagement with the support plate 28. The gasket secured to the lower end wall of the upper cartridge 29 has a sealing engagement with the gasket secured to the upper end wall of the lower cartridge 29 and the gasket secured to the lower end wall of the lower cartridge 29 rests on a removable annular cartridge support plate 35. The plate 35 is provided with three notches 36 equally spaced around the periphery thereof. The notches, when aligned with the inwardly turned projections 25 on the rails 24, permit the plate 35 to pass upward to a position above the projections 25 and then to be rotated through a small angle so that the projections will restrain the outward movement of the plate. A U-shaped handle 37 is welded to the plate 35 for ease of handling the plate. Between the outer extremities of the handle 37 and the inner extremities of the notches 36, the plate 35 is provided with a plurality of perforations 38 to permit the flow of fluid under pressure therethrough from the interior of the body 2 to the lower cartridge 29. A compression spring 39 is disposed between the cover 3 and plate 35 and is effective to force the gaskets 34 of the cartridges against each other and against the upper support plate 28 adjacent the air outlet end of the filtering apparatus. These gaskets 34 thus provide air-tight seals between the interior of the body 2 and the interior of casings 30 of the filter cartridges 29 so that the air supplied to the interior of body 2 through opening 10 in boss 9 is forced to pass through the perforations in the plates 35 and 31, the desiccant in the cartridges 29, the permeable member 18 and out the opening 14 in boss 13.

It may be noted that the cartridges 29 need have a seal or gasket 34 on only one end but this would require care in assembly and to eliminate this possibility of improper assembly, seals are provided at both ends of each cartridge.

The filtering apparatus, as illustrated in Fig. 1, is to be mounted with its longitudinal axis vertical or upright and the air outlet 14 at the top. In this position, the removable cover 3 will be disposed below the filter cartridges 29 and in a position to receive any liquid or condensate that may precipitate out of the air due to its impingement against the metallic interior walls of the body 2 and exterior walls of the casings 30 of the filter cartridges 29. A screw-threaded drain plug 40 is provided in the lowermost central portion of cover 3 to facilitate drainage of any liquid that may gather in the bottom of the filtering apparatus.

A pair of mounting brackets 41 are welded to the opposite ends of the body 2. Each bracket is provided with a pair of feet 42 having therein bolt holes to permit the filter unit to be mounted in any desired location.

*Operation*

In operation, air entering the opening 10 in air inlet boss 9 is deflected against the outside wall of casing 30 of the lower filter cartridge 29 whereupon it flows through the perforations 38 in the plate 35 since the seals 34 prevent flow in any other direction. After the air passes through the perforations 38 in the plate 35, it will pass upward through the desiccant in each filter cartridge 29 where the oil and water vapor is removed. After passing through the upper filter unit, the air will flow through the walls of the hollow cylindrical permeable member 18 to the interior thereof and thence through the openings between the ribs 17 of the air outlet boss 13 to the outlet opening 14 which is connected by a conduit (not shown) to a control device for controlling an air actuated mechanism.

If the filtering unit is subjected to considerable vibration, such as would be the case if mounted on a railroad locomotive, the vibration will tend to cause the granular desiccant to become dust, that is, the vibration plus the passage of air through the desiccant will cause the particles thereof to rub against each other and form a dust due to this frictional movement of the particles against each other. If the fine particles or dust of the desiccant were permitted to pass to the exterior of the filtering apparatus and to the control device it would cause impaired operation of the control device to which the air is supplied. Therefore, the permeable member 18 must be of such a porosity as to prevent the passage therethrough of these fine particles or dust. Experimentation has indicated that a porosity such as to restrain particles larger than 20 to 25 microns will be satisfactory and smaller particles will not impair the operation of devices receiving the air.

The removable cover 3 has been provided to permit the installation of cartridges in replacement of cartridges saturated or otherwise ineffective.

The various features and advantages of the design and construction disclosed are thought to be clear from the foregoing description. Various other features and advantages not specifically enumerated will undoubtedly occur to those versed in the art, as likewise will many variations and modifications of the preferred embodiment of the invention illustrated, all of which may be achieved without departing from the spirit and scope of the invention.

Having now described our invention, what we claim as new and desire to secure by Letters Patent, is:

1. A filter unit for removing oil vapor and water vapor from a gas, said unit comprising, in combination, a housing having an inlet, an outlet, and a removable end cover, a plurality of filtration cartridges arranged in tandem relation to each other and in spaced relation to the wall of said housing, each of said cartridges comprising a casing having imperforate side walls and a pair of foraminous end walls each secured to one end of said casing, and a quantity of metallic oxide desiccant selected from the group consisting of aluminum, iron and magnesium filling said casing, the space between said housing and said cartridges providing passage for fluid under pressure admitted through said inlet to one end of said tandem arranged filtration cartridges, a hollow cylindrical permeable member disposed in said housing adjacent the other end of said tandem arranged filtration cartridges, said hollow cylindrical permeable member being closed at one end adjacent the said cartridges and the other end being open to said outlet, the walls of said cylindrical permeable member comprising a ribbon of resin impregnated cellulose material helically wound edgewise and having such porosity as to prevent flow of gas therethrough to said outlet of solid particles larger than 20 microns, an annular stop member secured within said casing against which one end of said plurality of tandem arranged filtration cartridges seats in spaced relation to said cylindrical permeable member, and resilient biasing means disposed between the said other end of said plurality of tandem arranged filtration cartridges and said removable end cover for biasing said cartridges in the direction of said stop member.

2. A filter unit for removing oil vapor and water vapor from a gas, said unit comprising, in combination, a tubular housing having a gas outlet at one end and a gas inlet in the side wall thereof intermediate its ends, a hollow cylindrical permeable member disposed in and anchored to said housing adjacent said gas outlet, so as to have one end open to said gas outlet, said permeable member comprising helically wound cellulose ribbon impregnated with phenolic resin to provide said member with such porosity as to prevent passage therethrough of solid particles larger than 20 microns, means for closing the end of said hollow cylindrical permeable member opposite said one end thereof to provide for flow of gas therethrough to said gas outlet, an annular seating element disposed in and secured to said housing in a spaced-apart relationship to said permeable member, a plurality of tandem arranged filtration cartridges disposed in said housing with one end thereof disposed in contact with the side of said seating element opposite said permeable member, each of said cartridges comprising a casing having solid side walls and a pair of foraminous end walls each secured to one end of said casing to form therewith a cavity, an activated metallic oxide desiccant selected from the group consisting of aluminum, iron and magnesium filling said cavity, and an annular resilient sealing member secured to the side of each end wall opposite said cavity, said sealing members cooperating with said seating element and with one another to form gas-tight seals, a foraminous plate disposed in contact with the sealing member on the end of the cartridge adjacent thereto, a removable cover secured to the open end of said housing, and a spring disposed between said cover and said foraminous plate to bias said plate in the direction of said seating element to render said sealing members effective to provide a seal between said cartridges and between the end cartridges and said seating element and said foraminous plate respectively whereby flow of gas from said gas inlet to said gas outlet can only occur sequentially through said desiccant in said cartridges and through said permeable member.

3. A filter unit for removing oil vapor and water vapor from a gas, comprising, in combination, a cup-shaped housing open at one end and having a gas outlet at the opposite end and a gas inlet in the wall thereof intermediate said ends, a hollow cylindrical permeable member disposed in and anchored within said housing adjacent said gas outlet so as to have one end closed and the other end open to said gas outlet, said permeable member comprising cellulose ribbon impregnated with phenolic resin to provide said member with such porosity as to prevent passage therethrough of solid particles larger than 20 microns, an annular seating element disposed within and secured to the wall of said housing in a spaced-apart axial relationship to said permeable member, a plurality of equi-spaced centering rails disposed in said housing in contact with the interior wall thereof, a plurality of tandem arranged filtration cartridges disposed within said centering rails with one end thereof in contact with said seating element, each of said cartridges comprising a casing having imperforate side walls and a pair of foraminous end walls each secured to one end of said casing to form therewith a cavity, an activated metallic oxide desiccant selected from the group consisting of aluminum, iron and magnesium filling said cavity, and an annular resilient sealing member cemented to the side of each end wall opposite said cavity, a foraminous plate having a plurality of slots for the passage therethrough of the ends of said centering rails, said plate being disposed in contact with the sealing member on the end of the plurality of tandem arranged cartridges remote from said seating element, a cover removably secured to the open end of said housing, and a spring disposed between said cover and said foraminous plate to bias said plate and said cartridges in the direction of said seating element to render said sealing members effective to provide a gas tight seal between said cartridges and between one of said cartridges and said seating element whereby flow of gas from said gas inlet to said gas outlet can only occur sequentially through said desiccant in said cartridges and through said permeable member.

4. A filter unit as claimed in claim 3, further characterized in that said centering rails are provided with lateral extensions at the one end thereof for supporting said foraminous plate and said cartridges within said tubular housing, notwithstanding removal of said cover from the housing, when said plate is rotated from the position in which it is installed in said housing.

References Cited in the file of this patent

UNITED STATES PATENTS

| | | |
|---|---|---|
| 2,195,565 | Fricke | Apr. 2, 1940 |
| 2,526,782 | Thorpe | Oct. 24, 1950 |
| 2,758,719 | Line | Aug. 14, 1956 |
| 2,809,712 | Muller | Oct. 15, 1957 |